April 4, 1961     C. W. COCHRAN     2,977,652
MOLDING FASTENER
Filed Feb. 3, 1958

INVENTOR:
CLARENCE W. COCHRAN,
BY Walter S. Jones
ATTORNEY.

United States Patent Office 2,977,652
Patented Apr. 4, 1961

2,977,652

MOLDING FASTENER

Clarence W. Cochran, Belmont, Mass., assignor to United-Carr Fastener Corporation, Boston, Mass., a corporation of Delaware Filed Feb. 3, 1958, Ser. No. 712,749

1 Claim. (Cl. 24—73)

This invention relates to improvements in fastener members and fastener installations.

More particularly, this invention is directed to improve the method of fastening molding, trim strips and the like to an apertured support.

A primary object of the invention is to provide various kinds of fasteners of the type described wherein the fastener may be mounted onto a support structure by an operation taking place entirely from a readily accessible side thereof.

A further object of the invention is to provide a fastener that will be easily adjustable in a lateral direction after attachment to an apertured support.

Other objects of the invention will, in part, be obvious, and will, in part, appear hereinafter.

Figure 1:
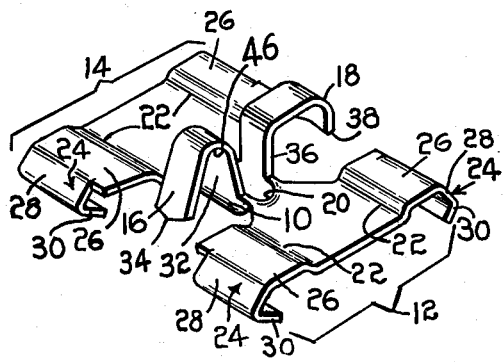
Fig. 1 is a view of the fastener in perspective.
Figure 2:
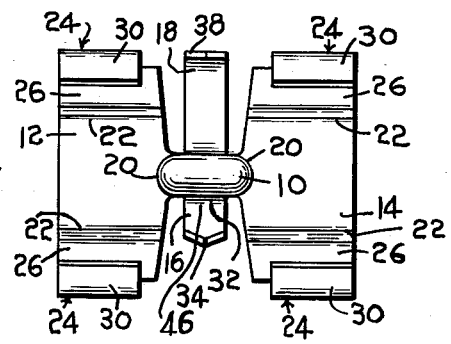
Fig. 2 is a plan view of the fastener shown in Fig. 1.
Figure 3:
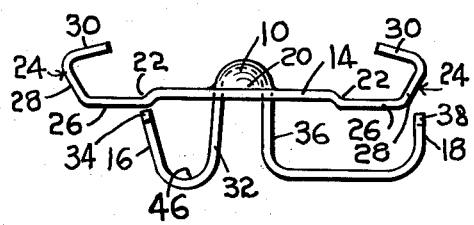
Fig. 3 is an end view of the fastener viewed from the right of Fig. 2.

According to the invention, I provide a fastener with a base portion embossed at the center 10 and including a pair of wing like extensions 12 and 14 respectively. Two U-shaped attaching fingers 16 and 18 are attached to the base portion adjacent to the embossed center portion 10, as shown in Fig. 3. The wing like extension 12, may be integral, as in my preferred embodiment, with the embossed portion 10 and may extend normally away from a terminal end 20 of the embossed portion 10. Integral with each side edge portion 22 of the extension 12 is an arm 24 formed by depressing the side edge 22 and then forming a straight support bearing portion 26 parallel with the plane of the base portion 10, in spaced relation thereto, integral with the said side edge 22. Finally, I form from the support bearing portion 26 an outwardly and upwardly diverging portion 28 which is integrally joined at its outer end to an inwardly and upwardly converging arm portion 30. The extension 14 is similar in all respects to the extension 12.

The attaching finger 16 projects out of the normal plane of the base 10 in a direction away from the extensions 12 and 14 to form a leg 32. The leg 32 is bent back upon itself to form an acute U-shape hook with the terminal end 34 of the leg 32 formed to a support biting edge.

The attaching finger 18 projects out of the normal plane of the base in a direction away from the extensions 12 and 14 to form a leg 36, in substantially parallel spaced relation with the leg 32. The finger 18 is bent back upon itself in a direction opposite to that of the finger 16, to form a broad U-shaped hook with its terminal end 38 formed to a support biting edge. The chord of the finger 16 is smaller than the chord of the finger 18.

Figure 4:
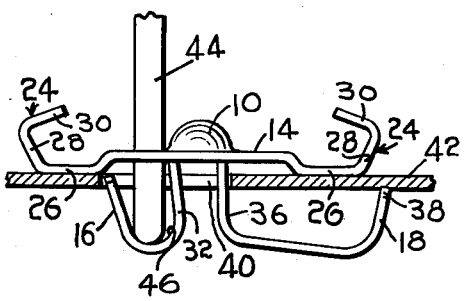
Fig. 4 is an elevation of the fastener, partly in section showing the position of the fastener in the first step in assembly.
Figure 5:
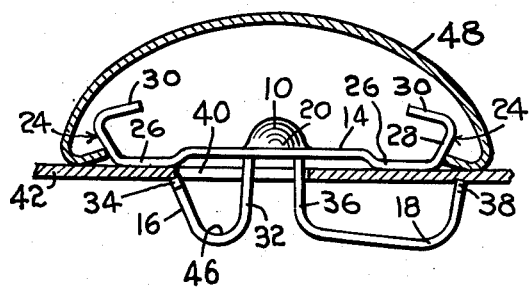
Fig. 5 is an assembly view of the fastener, partly in section, with the molding in place.
Figure 6:
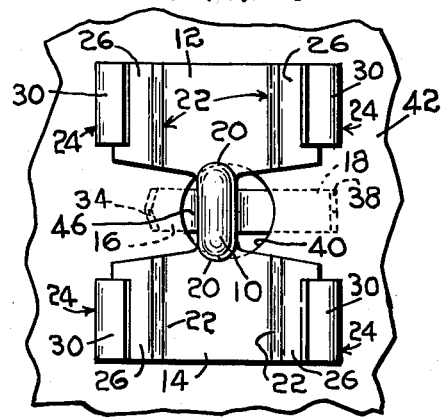
Fig. 6 is a plan view of the fastener and plate wherein the fastener is shown in adjusted position on plate.

To engage the fastener through the aperture 40 in a support 42 and against the side faces of the said support adjacent the aperture 40 as shown in Fig. 4 and Fig. 5, the finger 18 is passed through the aperture by a tipping action until its terminal end 38 bears on the support and the leg 36 bears against a wall of the aperture. In this position the base [which is of greater area than the aperture 40] rests against the upper side of the support 42 as shown in Fig. 4. An appropriate tool 44 is then placed into the bight 46 of the finger 16 (see Fig. 4) forcing the terminal end 34 to pass through the aperture at which time the tool 44 is canted against the terminal end 34 in a direction away from finger 18, causing it to engage a portion of the support adjacent to the aperture as shown in Fig. 5. A molding 48 can now be engaged with the device as shown in Fig. 5. The device and molding can now be adjusted in a direction parallel to the plane of the fingers 16 and 18 for a distance approximately equal to the diameter of the aperture, minus, of course, the space required for the legs.

It should be understood, however, that my improved attaching fingers may be satisfactorily used for attaching other parts together than those specifically illustrated in the drawing.

The vast majority of molding fasteners that will be found in the art are not adjustable once they have been fastened to the support. My invention allows for easy adjustment of the molding in relation to the support after the fastener has been applied.

Since certain other obvious modifications may be made in this device without departing from the scope of the invention, it is intended that all matters contained herein be interpreted in an illustrative and not in a limiting sense.

I claim:

A fastening device for use for attaching a molding to a relatively thin support having an aperture therethrough, said fastening device having a base which is provided with means for attachment of said molding at one side of the support and a pair of U-shaped attaching fingers having legs extending from said base through the aperture and each having an end portion turned outward from said legs and then back toward and engaging the opposite side of the support when in final position, one of said fingers having a greater distance between its leg and support engaging end portion than the other U-shaped finger and greater than the distance across said aperture, the other U-shaped finger having its leg spaced from the leg of said finger less than the distance across said aperture to thereby permit sliding adjustment, the distance between the support engaging ends of said fingers being substantially greater than the distance across said aperture and the support being sufficiently thin so that the legs may be passed through said aperture only by first tipping the said one leg through the aperture and then forcing the said other leg through the aperture while the fastening device base is being pressed flat against said support.

References Cited in the file of this patent

UNITED STATES PATENTS

| | | |
|---|---|---|
| 2,080,769 | Fitts | May 18, 1937 |
| 2,143,603 | Lombard | Jan. 10, 1939 |
| 2,217,574 | Tinnerman | Oct. 8, 1940 |
| 2,222,449 | Tinnerman | Nov. 19, 1940 |
| 2,327,329 | Murphy | Aug. 17, 1943 |
| 2,540,790 | Kost | Feb. 6, 1951 |
| 2,594,620 | Braithwaite | Apr. 29, 1952 |
| 2,659,951 | Tinnerman | Nov. 24, 1953 |
| 2,685,721 | Eves | Aug. 10, 1954 |